US008323134B2

(12) United States Patent
Tsukada et al.

(10) Patent No.: US 8,323,134 B2
(45) Date of Patent: Dec. 4, 2012

(54) TRANSMISSION CONTROLLER FOR CONTINUOUSLY VARIABLE TRANSMISSION SYSTEM

(75) Inventors: Yoshiaki Tsukada, Wako (JP); Hiroyuki Kojima, Wako (JP); Takashi Ozeki, Wako (JP); Hiroaki Uchisasai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1180 days.

(21) Appl. No.: 11/235,606

(22) Filed: Sep. 26, 2005

(65) Prior Publication Data

US 2006/0068953 A1    Mar. 30, 2006

(30) Foreign Application Priority Data

Sep. 29, 2004   (JP) .................................. 2004-283287

(51) Int. Cl.
*F16H 55/56* (2006.01)
(52) U.S. Cl. .................. 474/8; 474/3; 474/144
(58) Field of Classification Search .............. 474/3, 144, 474/69–70, 8–46; 74/335; 477/37
See application file for complete search history.

(56) References Cited

U.S. PATENT DOCUMENTS 6,026,921 A * 2/2000 Aoyama et al. .............. 180/65.2
6,217,469 B1 * 4/2001 Sawada et al. ................ 474/28
6,494,798 B1 * 12/2002 Onogi ............................ 474/28
7,316,630 B2 * 1/2008 Tsukada et al. ................. 477/3
2004/0171445 A1 * 9/2004 Yamamoto et al. ............ 474/28
2006/0183581 A1 * 8/2006 Iwatsuki et al. ................. 474/8

FOREIGN PATENT DOCUMENTS

| JP | 08-266012 | 10/1996 |
| JP | 09-14416 | 1/1997 |
| JP | 2002-206633 | 7/2002 |
| JP | 2003-14004 | 1/2003 |

* cited by examiner

*Primary Examiner* — Robert A Siconolfi
*Assistant Examiner* — James Hsiao
(74) *Attorney, Agent, or Firm* — Hamre, Schumann, Mueller & Larson, P.C.

(57) ABSTRACT

A transmission controller for a continuously variable transmission system steadily returns a gear ratio toward the low-ratio range, even after a driving pulley has stopped during sudden deceleration. A control unit is provided which drives an actuator to move a driving-pulley movable half part to a position in the low-ratio range when a vehicle speed sensor detects the sudden deceleration of a body, a pulley number-of-revolution sensor detects stopping of the driving pulley, and then a gear ratio sensor detects that the gear ratio of the continuously variable transmission system has not returned to the low-ratio range where a sufficient acceleration is obtainable at the time of restart. Upon detecting a restart, the control unit presses the driving-pulley movable half part onto a V-belt to prevent sliding therebetween and thereby reduce a loss in the transmission of a driving force at the time of restart.

8 Claims, 6 Drawing Sheets

TRANSMISSION CONTROLLER FOR CONTINUOUSLY VARIABLE TRANSMISSION SYSTEM

FIELD

The disclosed invention relates to a transmission controller for a continuously variable transmission system and, more particularly, to a transmission controller for a continuously variable transmission system which allows, even after the rotation of a driving pulley has stopped during sudden deceleration, steady returning of a gear ratio toward the low-ratio range.

BACKGROUND

There is known a conventional transmission mechanism having a structure in which a centrifugal start-up clutch is provided on an output side (i.e. driven side) which transmits the driving force of an engine to driving wheels via a belt-type continuously variable transmission system. Since the transmission mechanism allows the interruption of torque transmission between the driving wheels and the continuously variable transmission system when a vehicle suddenly stops, the gear ratio of the continuously variable transmission system can be shifted to a low gear-ratio range (i.e. a low-ratio range) by the rotation of the engine. But at that time, a large torque from the deceleration is placed on the output side of the continuously variable transmission system. To counteract the torque, the capacity of the start-up clutch should be increased, which leads to increases in the size and weight of the system. In addition, fluctuations in torque resulting from changes in the number of revolutions of the engine are input directly to the continuously variable transmission system so that a load not less than required is undesirably imposed on a belt of the continuously variable transmission system.

In a structure in which a start-up clutch is provided on the input side (i.e. the driving side) of a continuously variable transmission system, the gear ratio of the continuously variable transmission system is less likely to return toward the low-ratio range when a vehicle suddenly stops. In such a case, if the gear ratio of the continuously variable transmission system is not in the low-ratio range at the time of restart, sufficient acceleration performance cannot be obtained.

Japanese Patent Document JP-A No. 14004/2003 discloses a variable-speed drive where a start-up clutch is provided on the input side and which opens the start-up clutch when the vehicle comes to a sudden stop to prevent an engine stall. Power transmission to the output shaft of the continuously variable transmission system is then interrupted by using a switching mechanism for disconnecting and connecting power transmission to the driving wheels to reduce the load on the belt. The drive subsequently re-engages the start-up clutch to return the gear ratio toward the low-ratio range.

However, the technology of Japanese Patent Document JP-A No. 14004/2003 has the problem that the gear ratio of the continuously variable transmission system cannot be returned to the low-ratio range in the state in which the number of revolutions of the crankshaft of the engine is reduced to a specified value or less and the rotation of the driving pulley has stopped. The technology in Japanese Patent Document JP-A No. 14004/2003 also has the problem that a clutch capable of controlling disconnection and connection becomes necessary on each of the input and output sides of the continuously variable transmission system, which leads to a complicated structure, increased weight, and an increased number of assembly stops.

SUMMARY

A transmission controller for a continuously variable transmission system is disclosed which allows steady returning of the gear ratio toward the low-ratio range even after the rotation of a driving pulley has stopped during sudden deceleration. The transmission controller has a simplified structure, reduced weight, and a reduced number of assembly steps.

In one embodiment, a transmission controller for a continuously variable transmission system of a vehicle having an engine that includes a crankshaft and having a driving wheel, is provided. The transmission system includes a driving pulley having an adjustable width, a driven pulley, a belt wound between the driving pulley and the driven pulley, a free wheeling clutch connected between the continuously variable transmission system and the driving wheel and configured to transmit power only in one direction from the continuously variable transmission system toward the driving wheel, and a start-up clutch connected between the crankshaft of the engine and the driving pulley to transmit power from the crankshaft to the continuously variable transmission system when the number of revolutions of the crankshaft equals or exceeds a specified value and where a winding diameter of the belt wound between the driving pulley and the driven pulley is changed in accordance with the number of revolutions of the driving pulley. The transmission controller comprises gear ratio changing means for changing a gear ratio of the continuously variable transmission system; gear ratio detecting means for detecting the gear ratio of the continuously variable transmission system; pulley number-of-revolution detecting means for detecting the number of revolutions of the driving pulley; and control means for performing a control operation to drive the gear ratio changing means and thereby change a width of the driving pulley when the pulley number-of-revolution detecting means detects that the driving pulley has stopped and the gear ratio detecting means detects that the gear ratio of the continuously variable transmission system is not in a specified state.

With this construction, even after the rotation of the driving pulley has stopped during sudden deceleration, the gear ratio can be changed promptly toward, e.g., the low-ratio range. This improves the performance of restart after sudden deceleration.

In another embodiment, the driven pulley is biased into engagement with the belt and the gear ratio changing means increases the width of the driving pulley when the pulley number-of-revolution detecting means detects that the driving pulley has stopped and the gear ratio detecting means detects that the gear ratio of the continuously variable transmission system is not in the specified state. Accordingly, even after the rotation of the driving pulley has stopped during deceleration, the belt moves slidingly along the pulley surface of the driving pulley under a force received from the driven pulley. This allows steady returning of the gear ratio toward the low-ratio range.

In addition, the gear ratio changing means can increase the width of the driving pulley until the gear ratio of the continuously variable transmission system reaches a specified value when the pulley number-of-revolution detecting means detects that the driving pulley has stopped and the gear ratio detecting means detects that the gear ratio of the continuously variable transmission system is not in the specified state and the gear ratio changing means then reduces the width of the driving pulley to press the belt. Accordingly, even after the rotation of the driving pulley has stopped during sudden deceleration, the gear ratio can be returned steadily and reliably to the low-ratio range. In addition, a loss in the driving force of the continuously variable transmission system can be prevented without causing a slide between the driving pulley and the belt at the time of restart.

In one embodiment, the gear ratio changing means is an actuator coupled to the driving pulley. This makes it possible to stably control the changing of the gear ratio by using control signals from a control unit and reduce the weight and the number of assembly steps by simplifying the structure.

In another embodiment, the transmission controller further comprises a drive motor, separate from the engine, coupled to the driving wheel and providing power to said driving wheel. This is useful when applying the concepts of the transmission controller in a hybrid vehicle.

DETAILED DESCRIPTION

Figure 1:
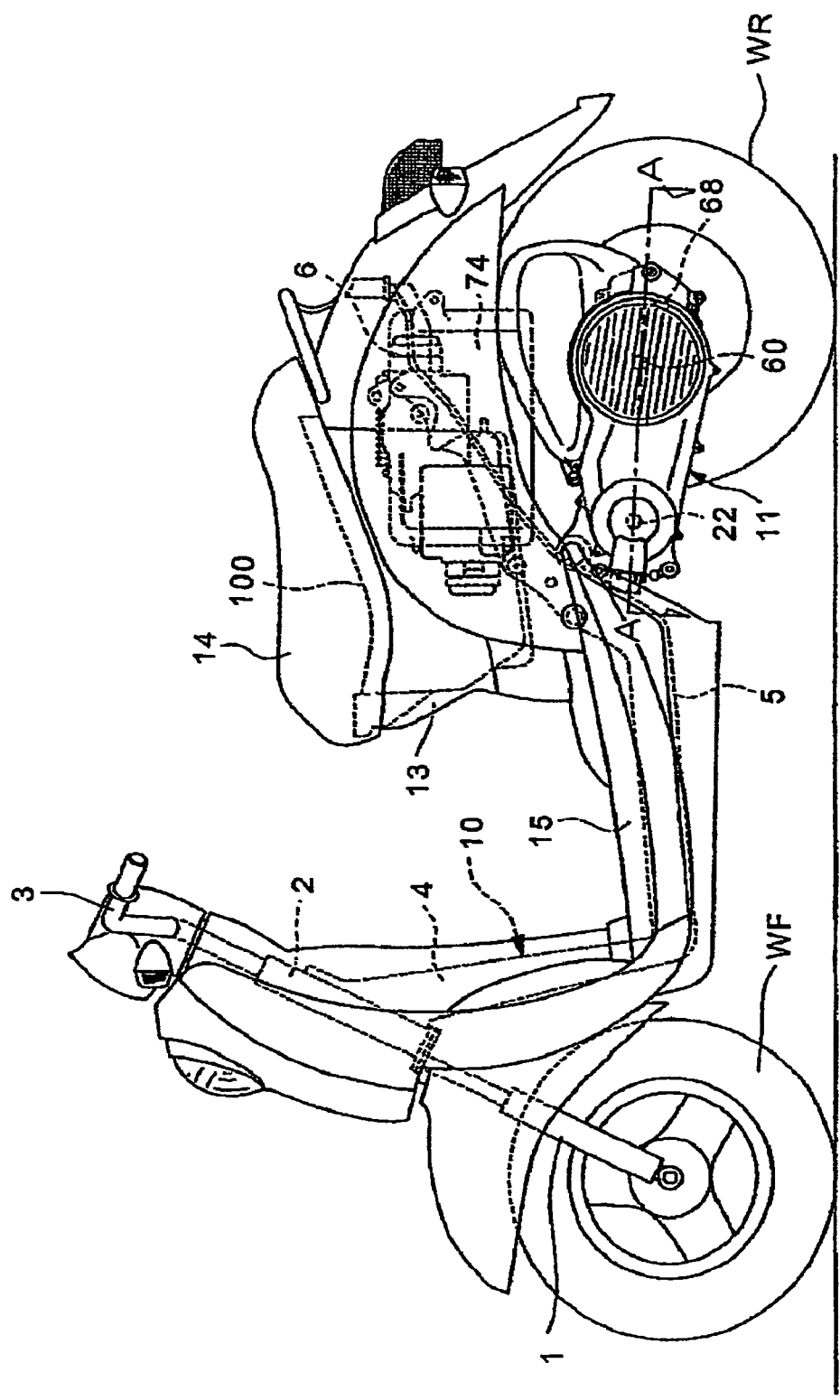
FIG. 1 is a side view showing a schematic structure of a hybrid vehicle to which the present invention has been applied.

Referring now to the drawings, FIG. 1 is a side view of an embodiment of a scooter-type hybrid vehicle to which the present invention can be applied.

The hybrid vehicle has a front fork 1 for rotatably supporting a front wheel WF forwardly of a body. The front fork 1 is pivoted on a head pipe 2 and can be steered by the operation of a handlebar 3. A down pipe 4 is attached to the head pipe 2 and extends rearwardly and downwardly therefrom. A middle frame 5 extends generally horizontally from the lower end of the down pipe 4. From the rear end of the middle frame 5, a rear frame 6 is further formed to extend rearwardly and upwardly therefrom.

The head pipe 2, down pipe 4, middle frame 5 and rear frame 6 form a body frame 10. One end of a power unit 11, including an engine as a power source and a drive motor, is pivotally attached to the body frame 10. The power unit 11 has a rear end as the other end thereof to which a rear driving wheel WR is rotatably attached and is suspended by a rear cushion (not shown) attached to the rear frame 6.

The body frame 10 has an outer circumferential portion thereof covered with a body cover 13. A seat 14 on which a rider is seated is fixed to the upper surface of the body cover 13 to extend rearwardly thereof. A step floor 15 on which the rider rests his or her feet is formed forwardly of the seat 14. A storage box 100 functioning as a utility space for storing a helmet, luggage, and the like is provided under the seat 14. A battery 74 is contained in the body cover 13 rearwardly of the storage box 100. Reference numeral 22 denotes the axial position of the crankshaft of the engine, numeral 60 denotes the axial position of a drive shaft, and numeral 68 denotes the axial position of the axle of the rear wheel WR.

Figure 2:
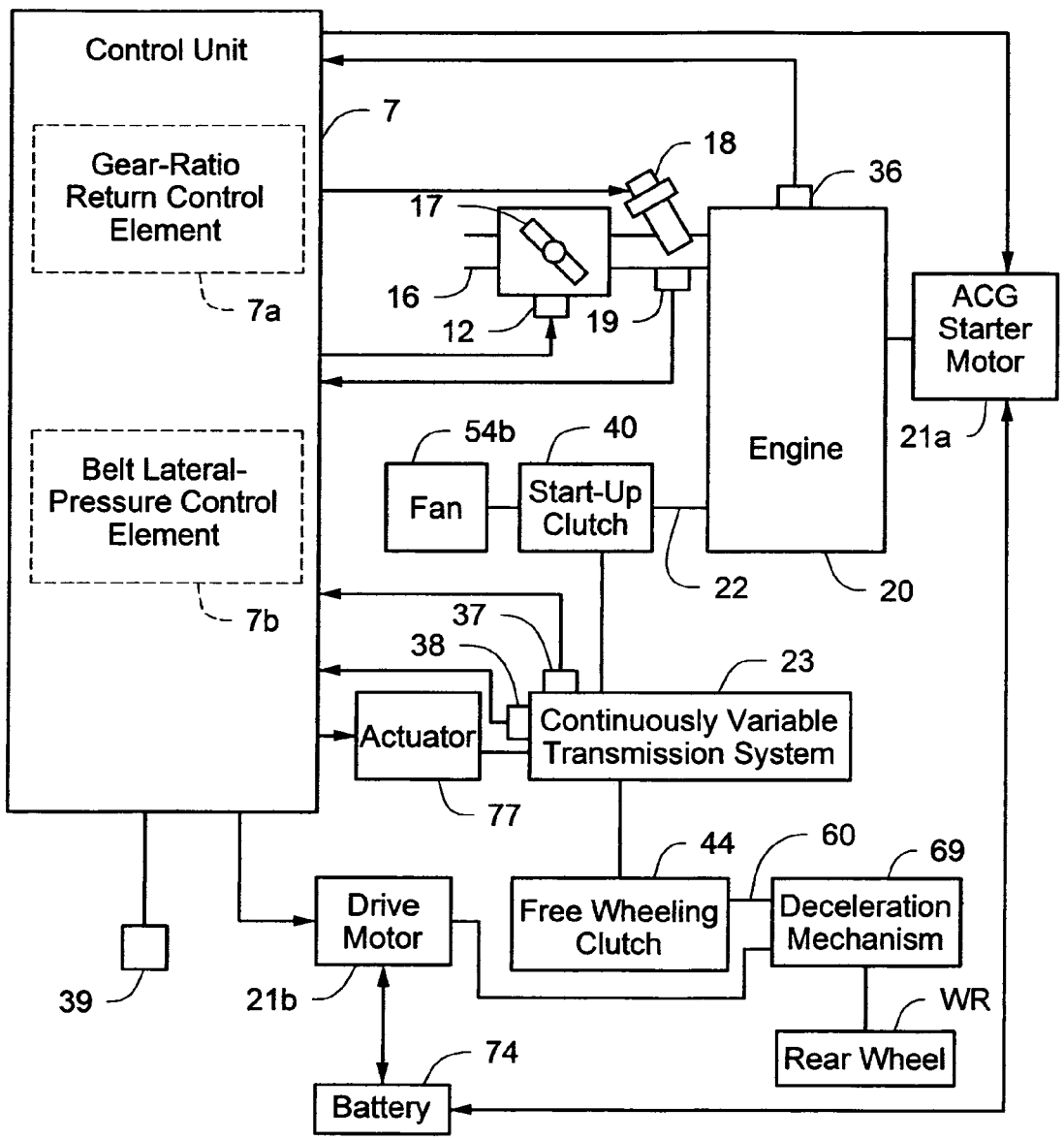
FIG. 2 is a block diagram showing the system structure of the hybrid vehicle shown in FIG. 1.

FIG. 2 is a block diagram showing the system structure of the hybrid vehicle described above. The power unit 11 comprises: an engine 20; an ACG starter motor 21a functioning as an engine starter and a power generator; a continuously variable transmission system 23 coupled to a the crankshaft 22 to transmit the power of the engine 20 to the rear wheel WR; an actuator 77 (e.g., a transmission motor) as gear ratio changing means for the gear transmission of the continuously variable transmission system 23; a start-up clutch 40 for connecting or disconnecting power transmission between the crankshaft 22 and the continuously variable transmission system 23; a free wheeling clutch 44 which transmits power from the engine 20 and a drive motor 21b toward the rear wheel WR but does not transmit power from the rear wheel WR toward the engine 20; the drive motor 21b functioning as a motor or a power generator; and a deceleration mechanism 69 which decelerates the output of the continuously variable transmission system 23 and transmits the decelerated output to the rear wheel WR.

With continued reference to FIG. 2, the number of revolutions Ne of the engine 20 is sensed by an engine number-of-revolution sensor 36. The continuously variable transmission system 23 is provided with a gear ratio sensor 37 as gear ratio detecting means for detecting a gear ratio Rm and with a pulley number-of-revolution sensor 38 as pulley number-of-revolution detecting means for detecting the number of revolutions Np of a driving pulley 58 (see FIG. 3). Reference numeral 39 denotes a vehicle speed sensor for detecting a vehicle speed Vb, which is provided at an arbitrary position.

In FIG. 2, the power from the engine 20 is transmitted to the rear wheel WR via the crankshaft 22, the start-up clutch 40, the continuously variable transmission system 23, the free wheeling clutch 44, a drive shaft 60, and the deceleration mechanism 69. On the other hand, the power from the drive motor 21b is transmitted to the rear wheel WR via the drive shaft 60 and the deceleration mechanism 69. Thus, according to the present embodiment, the drive shaft 60 serves as the output shaft of the engine 20 and also as the output shaft of the drive motor 21b. To the left end portion in the vehicle width direction of the crankshaft 22, a fan 54b is connected via the start-up clutch 40 to cool the continuously variable transmission system 23.

A battery 74 is connected to the ACG starter motor 21a and to the drive motor 21b. The battery 74 is configured to supply power to the motors 21a and 21b when the drive motor 21b functions as a motor and when the ACG starter motor 21a functions as a starter, while it is configured to be charged, when each of the motors 21a and 21b functions as a power generator, with the regenerative powers thereof.

Also in FIG. 2, a control unit 7 as control means includes a gear-ratio return control element 7a which controls the driving of the actuator 77 to return the gear ratio of the continuously variable transmission system 23 toward the low-ratio range on a sudden stop and a belt lateral-pressure control element 7b which controls the driving of the actuator 77 to prevent the occurrence of sliding between a V-belt 63 (see FIG. 3) and the driving pulley 58 at the time of restart.

In a suction pipe 16 of the engine 20, a throttle valve 17 is rotatably mounted to control an amount of air provided to the engine. The throttle valve 17 is rotated in accordance with an amount of operation of a throttle grip (not shown) operated by the rider. Although the present embodiment illustrates a throttle opening sensor 12 in the throttle valve 17, the throttle opening sensor 12 may also be provided in the throttle grip, in a wire coupling the throttle grip to the throttle valve 17, or the like. Between the throttle valve 17 and the engine 20, an injector 18 for spraying a fuel and a negative pressure sensor 19 which detects a negative pressure in the suction pipe are arranged. It is also possible to mount a DBW (Drive-By-Wire) system which performs automatic control based on the number of revolutions of the engine, the vehicle speed, or the like without regard to the operation of the rider.

Figure 3:
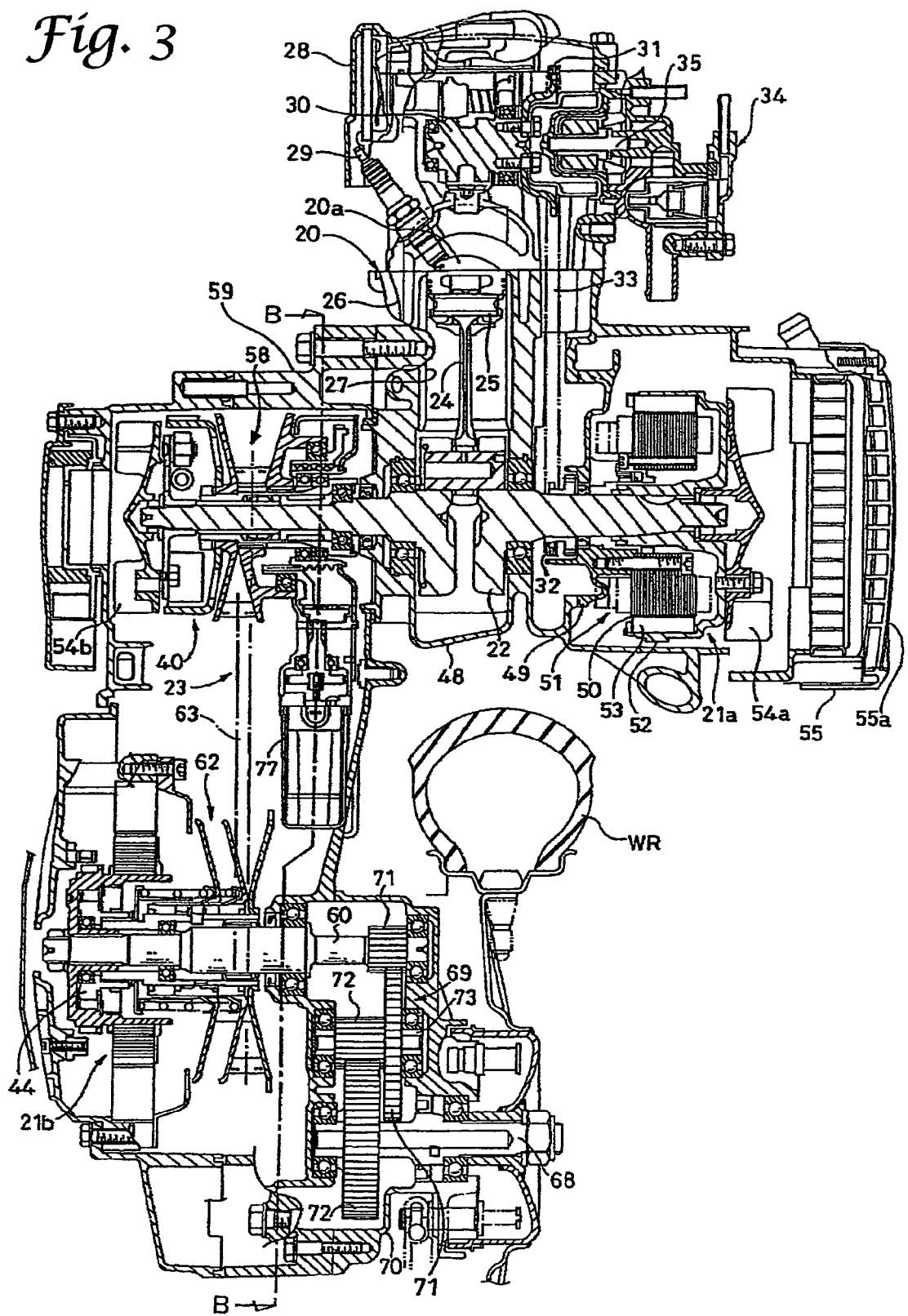
FIG. 3 is a cross-sectional view of the power unit of the hybrid vehicle shown in FIG. 1, which is taken along the line A-A thereof.

With reference now to FIG. 3, which is a cross-sectional view taken along the line A-A of FIG. 1, the structure of the power unit 11 including the engine 20 and the drive motor 21b will now be described.

The engine 20 comprises a piston 25 coupled to the crankshaft 22 via a rod 24. The piston 25 is slidable in a cylinder 27 provided in a cylinder block 26. The cylinder block 26 is disposed such that the axis of the cylinder 27 is generally horizontal. A cylinder head 28 is fixed to the front surface of the cylinder block 26. A combustion chamber 20a for the combustion of a gas mixture is formed by the cylinder head 28, the cylinder 27, and the piston 25.

In the cylinder head 28, there are disposed a valve (not shown) for controlling the suction of the gas mixture into the combustion chamber 20a or exhaust therefrom and an ignition plug 29 for the ignition of the compressed gas mixture. The opening/closing of the valve is controlled by the rotation of a cam shaft 30 rotatably supported on the cylinder head 28. The cam shaft 30 has a driven sprocket 31 on one end thereof and an endless cam chain 33 is wound between the driven sprocket 31 and a driving sprocket 32 provided on one end of the crankshaft 22. The cam shaft 30 has one end provided with a water pump 34 for cooling the engine 20. The water pump 34 has a rotation shaft 35 thereof integrally rotating with the cam shaft 30. Accordingly, when the cam shaft 30 rotates, the water pump 34 can be operated.

A stator case 49 is coupled to the right side (in the vehicle width direction) of a crankcase 48 which rotatably supports the crankshaft 22. The ACG starter motor 21a is a so-called outer-rotor-type motor and the stator thereof is composed of a coil 51 obtained by winding a conductor wire around a teeth 50 fixed to the stator case 49. On the other hand, the outer rotor 52 is fixed to the crankshaft 22 and has a generally cylindrical configuration covering the outer circumferential portion of the stator. In addition, a magnet 53 is disposed on the inner circumferential surface of the outer rotor 52.

A fan 54a for cooling the ACG starter motor 21a is attached to the outer rotor 52. When the fan 54a rotates in synchronization with the crankshaft 22, air for cooling is supplied from a cooling air inlet formed in the side surface 55a of the cover 55 of the stator case 49.

A power transmission case 59 is coupled to the left side (in the vehicle width direction) of the crankcase 48. In the power transmission case 59, there are contained the fan 54b fixed to the left end portion of the crankshaft 22, the continuously variable transmission system 23 having a driving side thereof coupled to the crankshaft 22 via the start-up clutch 40, and the drive motor 21b coupled to the driven side of the continuously variable transmission system 23. The fan 54b is for cooling the continuously variable transmission system 23 and the drive motor 21b contained in the power transmission case 59 and is disposed on the same side as the drive motor 21b relative to the continuously variable transmission system 23, i.e., on the left side in the vehicle width direction in the present embodiment, similarly to the drive motor 21b.

The front and left sides of the power transmission case 59 (from the viewpoint of the body 10) are formed with a cooling air inlet (not shown). When the fan 54b rotates in synchronization with the crankshaft 22, outside air is supplied into the power transmission case 59 from the cooling air inlet located in the vicinity of the fan 54b to forcibly cool the drive motor 21b and the continuously variable transmission system 23.

The continuously variable transmission system 23 is a belt converter composed of an endless V-belt (endless belt) 63 which is wound between the driving pulley 58 attached via the start-up clutch 40 to the left end portion of the crankshaft 22 protruding in the vehicle width direction from the crankcase 48 and the driven pulley 62 attached via the free wheeling clutch 44 to the drive shaft 60 rotatably supported by the power transmission case 59 to have an axis parallel with the crankshaft 22. In the present embodiment, the actuator 77 for changing the gear ratio is provided in the vicinity of the driving pulley 58. The deceleration mechanism 69 and the components subsequent thereto will be described later.

Figure 4:
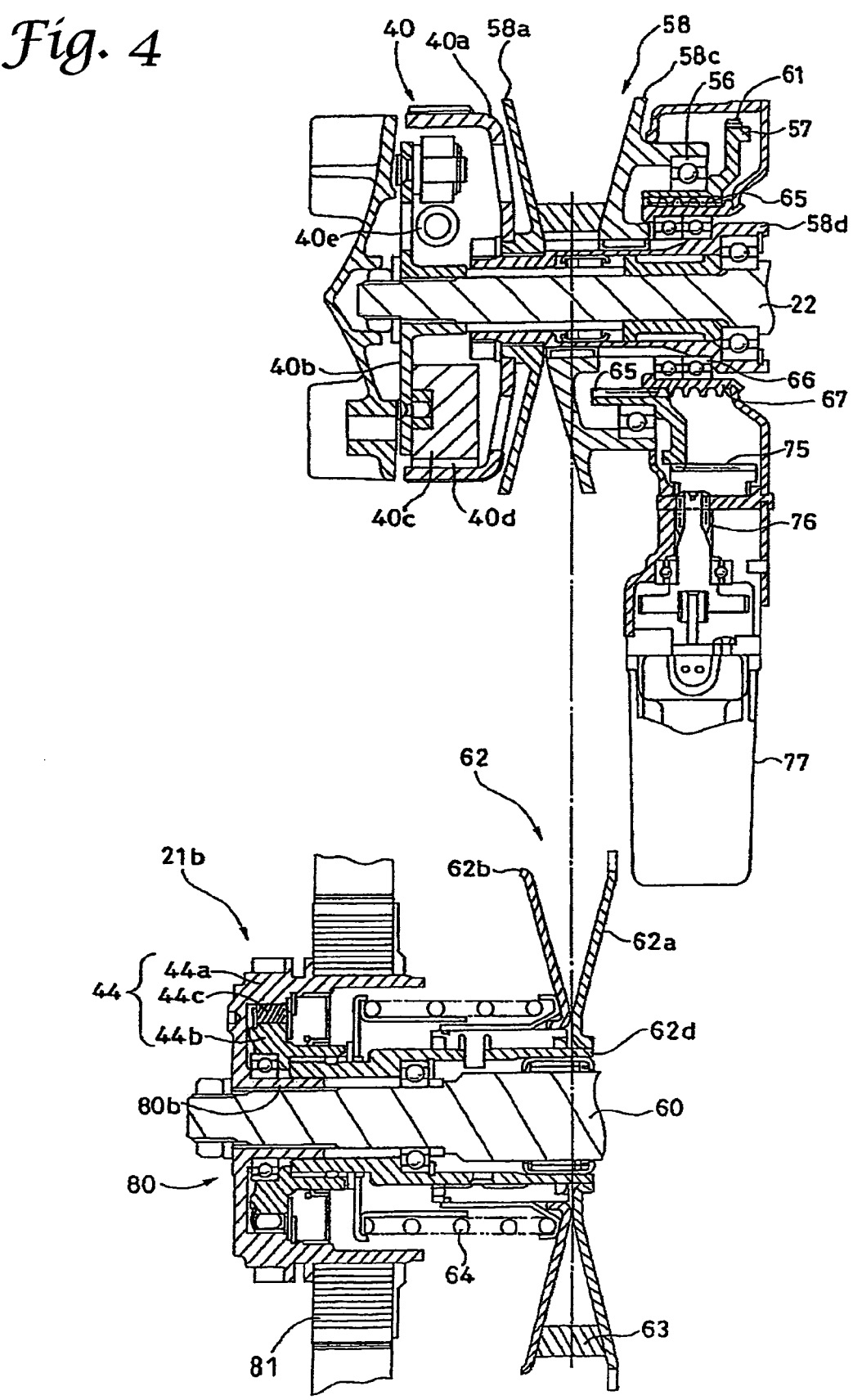
FIG. 4 is an enlarged view of the principal portion of a continuously variable transmission system portion in FIG. 3.

FIG. 4 is an enlarged view of the principal portion of the continuously variable transmission system 23. The driving pulley 58 is attached to the crankshaft 22 via a sleeve 58d to be rotatable in the circumferential direction thereof. The driving pulley 58 comprises a driving-pulley fixed half part 58a fixed onto the sleeve 58d and a driving-pulley movable half part 58c attached to the sleeve 58d to be slidable in the axial direction thereof but unrotatable in the circumferential direction thereof. To the driving-pulley movable half part 58c, a transmission ring 57 is rotatably attached via a bearing 56.

The transmission ring 57 has a large-diameter outer circumferential portion thereof formed with a gear 61 along the circumferential direction thereof, while having an inner circumferential portion thereof formed with a trapezoidal screw 65 along the axial direction thereof. The trapezoidal screw 65 has a meshing engagement with a trapezoidal screw 67 attached to the sleeve 58d via a bearing 66 to be rotatable in the circumferential direction thereof but unslidable in the axial direction thereof. A worm wheel 75 has a meshing engagement with the gear 61 of the transmission ring 57. In addition, a worm gear 76 coupled to the rotation shaft of the actuator 77 for controlling the gear ratio has a meshing engagement with the worm wheel 75.

On the other hand, the driven pulley 62 has a driven-pulley fixed half part 62a mounted on the drive shaft 60 via the sleeve 62d to have a slidable motion thereof restricted in the axial direction thereof but to be rotatable in the circumferential direction thereof, and a driven-pulley movable half part 62b mounted on the sleeve 62d to be slidable in the axial direction thereof. The endless V-belt 63 is wound in and around the belt grooves each having a generally V-shaped configuration and formed between the driving-pulley fixed half part 58a and the driving-pulley movable half part 58c and between the driven-pulley fixed half part 62a and the driven-pulley movable half part 62b.

On the back side (the left side in the vehicle width direction) surface of the driven-pulley movable half part 62b, a resilient member 64, for example a spring, is disposed to constantly bias the driven-pulley movable half part 62b toward the driven-pulley fixed half part 62a.

The changing of the gear ratio of the continuously variable transmission system 23 is performed by driving the actuator 77 in the direction corresponding to the shifting up/down of the gear ratio. The driving force of the actuator 77 is transmitted to the gear 61 of the transmission ring 57 via the worm gear 76 and the worm wheel 75 to rotate the transmission ring 57. Since the transmission ring 57 has a meshing engagement with the sleeve 58d via the trapezoidal screws 65 and 67, it moves leftward in FIG. 4 over the crankshaft 22 when the direction of rotation of the transmission ring 57 is a shift-up direction (top-ratio direction). With the movement of the transmission ring 57, the driving-pulley movable half part 58c slides in a direction in which it approaches the driving-pulley fixed half part 58a. Since the driving-pulley movable half part 58c approaches the driving-pulley fixed half part 58a by a distance corresponding to the sliding motion and the groove width of the driving pulley 58 is reduced accordingly, the contact position between the driving pulley 58 and the V-belt 63 shifts outwardly in the radial direction of the driving pulley 58 so that the winding diameter of the V-belt 63 is increased. In FIG. 4, the low-ratio position is shown above the crankshaft 22 and the top-ratio position is shown below the crankshaft 22. In response to this movement, a force to reduce the winding diameter acts on the driven pulley 62 because the distance between the crankshaft 22 and the drive shaft 60 is invariable and the V-belt 63 has an endless configuration. Consequently, the driven-pulley movable half part 62b slides leftward in FIG. 4 against a resilient force resulting from biasing by the spring 64 so that the groove width formed by the driven-pulley fixed half part 62a and the driven-pulley movable half part 62b increases. Thus, the continuous changing of the gear ratio is implemented by the continuous changing of the winding diameter (i.e. the transmission pitch diameter) of the V-belt 63.

The start-up clutch 40 is composed of a cup-shaped outer case 40a fixed to the sleeve 58d, an outer plate 40b fixed to the left end portion of the crankshaft 22, a shoe 40d attached to the outer circumferential portion of the outer plate 40b via a weight 40c to face outward in the radial direction, and a spring 40e for biasing the shoe 40d inward in the radial direction.

When the number of revolutions of the engine, i.e., the number of revolutions of the crankshaft 22, is not more than a specified value (e.g., 3000 rpm), power transmission between the crankshaft 22 and the continuously variable transmission system 23 is interrupted by the start-up clutch 40. When the number of revolutions of the engine increases and the number of revolutions of the crankshaft 22 exceeds the specified value, a centrifugal force acting on the weight 40c counteracts the resilient force exerted inward in the radial direction by the spring 40e and the weight 40c moves outward in the radial direction so that the shoe 40d is pressed onto the inner circumferential surface of the outer case 40a under a force not less than the specified value. As a result, the rotation of the crankshaft 22 is transmitted to the sleeve 58d via the outer case 40a to drive the driving pulley 58 fixed to the sleeve 58d.

The driven free wheeling clutch 44 comprises a cup-shaped outer clutch 44a, an inner clutch 44b coaxially inserted in the outer clutch 44a, and a roller 44c which allows power transmission only in one direction from the inner clutch 44b to the outer clutch 44a. The outer clutch 44a also serves as the main body of the inner rotor of the drive motor 21b and is composed of the same member forming the main body of the inner rotor.

The power from the engine 20 transmitted to the driven pulley 62 of the continuously variable transmission system 23 is transmitted to the rear wheel WR via the driven-pulley fixed half part 62a, the inner clutch 44b, the outer clutch 44a, i.e., the main body of the inner rotor, the drive shaft 60, and the deceleration mechanism 69. On the other hand, the power from the rear wheel WR during the walking of the vehicle or the like is transmitted to the deceleration mechanism 69, to the drive shaft 60, and to the main body of the inner rotor, i.e., the outer clutch 44a. But, because the outer clutch 44a freewheels relative to the inner clutch 44b, the power from the rear wheel WR is prevented from being transmitted to the continuously variable transmission system 23 and to the engine 20. In addition, during driving using the drive motor 21b as the power source, the power from the drive motor 21b is also prevented from being transmitted to the continuously variable transmission system 23 and to the engine 20 in the same manner as described above.

The drive motor 21b includes an inner rotor 80 that comprises the drive shaft 60 which also serves as the output shaft of the continuously variable transmission system 23 and the main body of the inner rotor, i.e., the outer clutch 44a which is shaped like a cup and spline-coupled to the drive shaft 60 at a boss portion 80b formed in the center portion thereof. A coil 81 is disposed on the outer circumferential surface of the outer clutch 44a to be closer to the opening thereof.

Referring back to FIG. 3, the deceleration mechanism 69 and the components subsequent thereto will be described. The deceleration mechanism 69 is provided in a transmission chamber 70 connecting to the right side of the rear end portion of the power transmission case 59. The deceleration mechanism 69 includes a middle shaft 73 rotatably supported to be parallel with the drive shaft 60 and the axle 68 of the rear wheel WR, a first pair of deceleration gears 71 disposed at the right end portion of the drive shaft 60 and at the center portion of the middle shaft 73, respectively, and a second pair of deceleration gears 72 disposed at the respective left end portions of the middle shaft 73 and the axel 68. By the structure described above, the rotation of the drive shaft 60 is decelerated at a specified deceleration ratio and transmitted to the axle 68 of the rear wheel WR.

Figure 5:
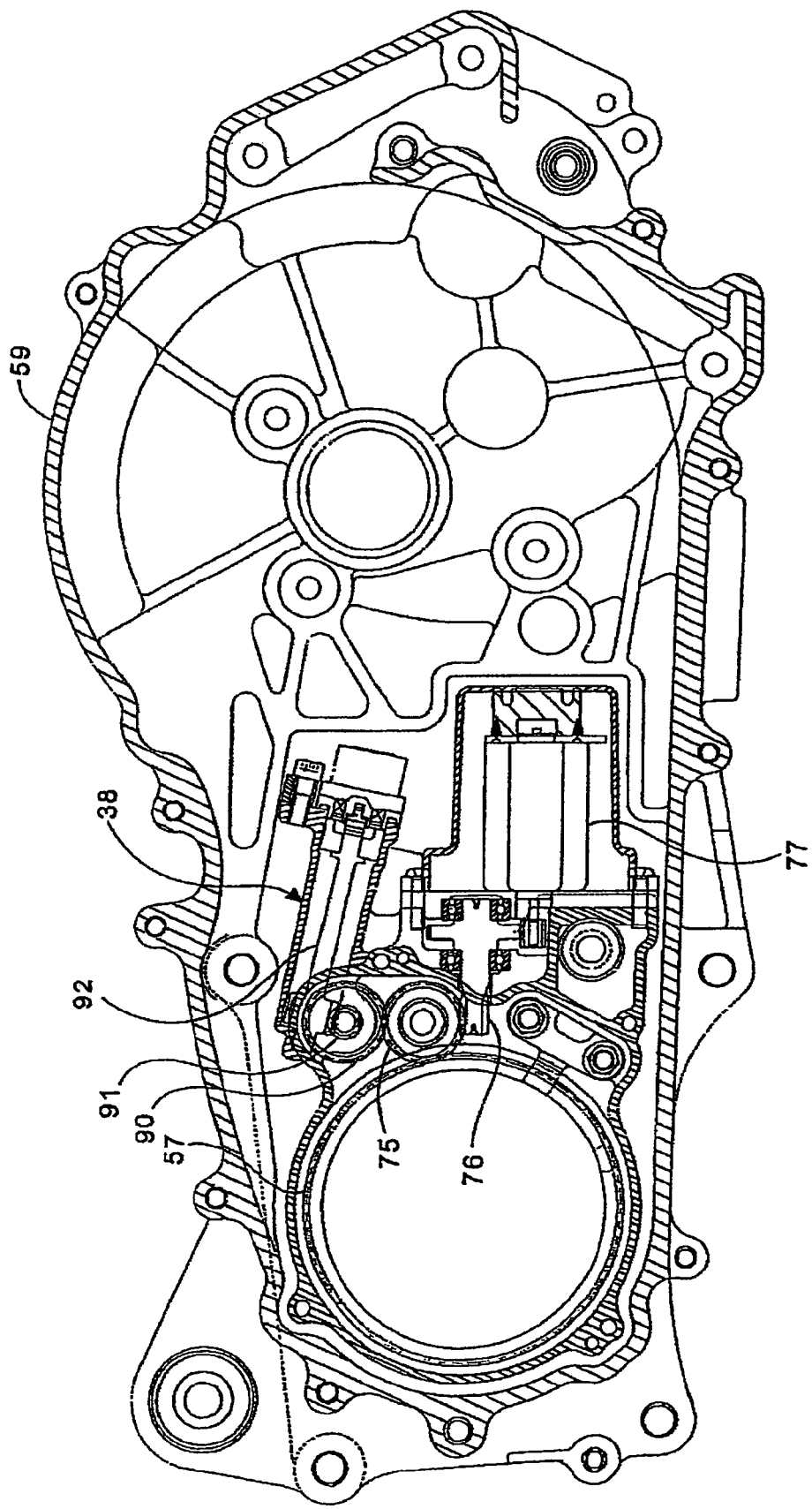
FIG. 5 is a partial side/cross-sectional view taken along the line B-B of FIG. 3.

FIG. 5 is a partial side/cross-sectional view taken along the line B-B of FIG. 3. When the gear ratio of the continuously variable transmission system 23 is changed, the actuator 77 provided in the power transmission case 59 is driven and the driving force is transmitted to the transmission ring 57 via the worm gear 76 and the worm wheel 75. On the other hand, the driving force transmitted to the worm wheel 75 is transmitted to a sensor rod 92 in the gear ratio sensor 38 by a worm wheel 90 and a worm gear 91 coaxial thereto. The gear ratio sensor 38 in the present embodiment is a position sensor which detects the amount of rotation of the transmission ring 57. The gear ratio sensor 38 can be a magnetic sensor which measures, in a magnetic non-contact manner, an amount of the axial movement of an object resulting from the rotation of the sensor rod 92 or the like. However, the gear ratio detecting means is not limited to the present embodiment.

The procedure of gear-ratio return control according to the present embodiment in the hybrid vehicle composed of the structure described above will now be described. When the engine starts, the crankshaft 22 is rotated by using the ACG starter motor 21a on the crankshaft 22. At this time, the start-up clutch 40 is not connected so that power transmission from the crankshaft 22 to the continuously variable transmission system 23 is interrupted. When a throttle opening Tp becomes larger to increase the number of revolutions Np of the engine and the number of revolutions of the crankshaft 22 exceeds a specified value (e.g., 3000 rpm), the rotating power of the crankshaft 22 is transmitted to the continuously variable transmission system 23 via the start-up clutch 40 and inputted to the free wheeling clutch 44. The driving force inputted to the free wheeling clutch 44 rotates the rear wheel WR via the deceleration mechanism 69 and drives the vehicle. With the increase of the vehicle speed Vb, the driving-pulley movable half part 58c and the driven-pulley movable half part 62b in the continuously variable transmission system 23 move successively to the positions in the top-ratio range.

Figure 6:
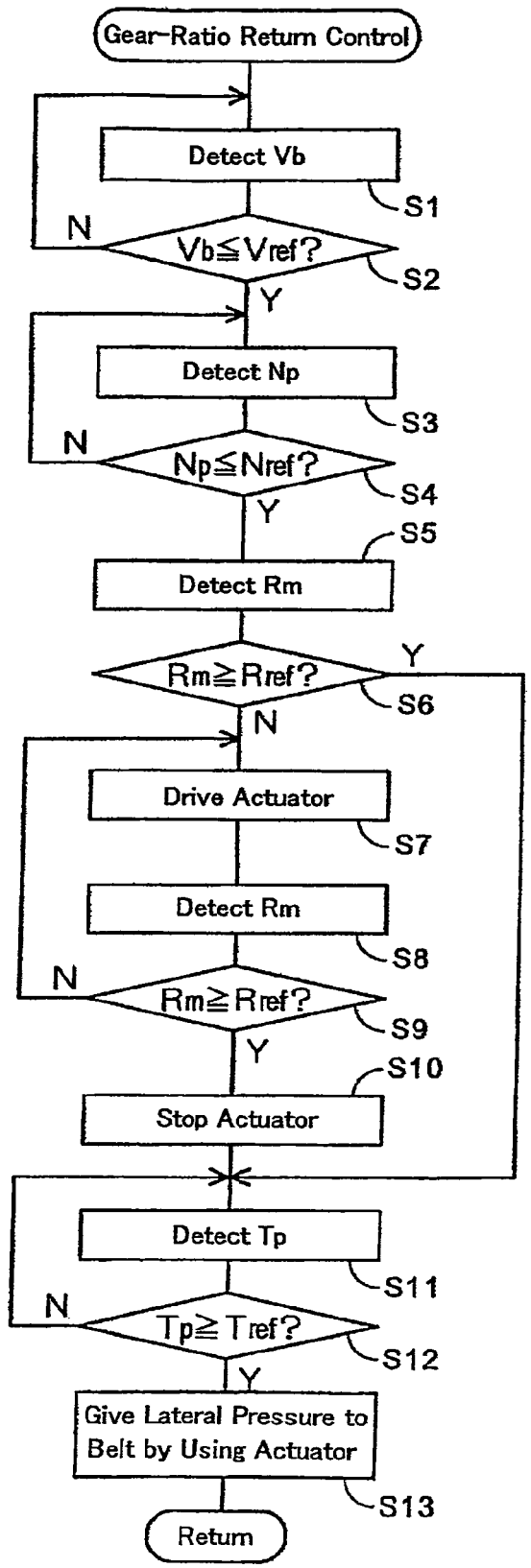
FIG. 6 is a flow chart illustrating the procedure of gear-ratio return control according to an embodiment of the present invention.

FIG. 6 is a flow chart illustrating the procedure of gear-ratio return control and belt lateral-pressure control using the control unit 7 of FIG. 2, which is repeatedly executed in a specified cycle.

In Step S1, the vehicle speed Vb is determined based on an output signal from the vehicle speed sensor 39. In Step S2, a comparison is made between the vehicle speed Vb and a reference speed Vref to judge whether or not the vehicle is in a stopped or quasi-stopped state. If the vehicle speed Vb is less than or equal to the reference speed Vref and it is judged that the body is in the stopped or quasi-stopped state, the whole process flow advances to Step S3. In Step S3, the number of revolutions Np of the driving pulley is determined based on an output signal from the pulley number-of-revolution sensor 37. In Step S4, a comparison is made between the pulley number of revolutions Np and a reference number of revolutions Nref to judge whether or not the pulley is in a stopped or quasi-stopped state. If the number of revolutions Np of the driving pulley is under the reference number of revolutions Nref and it is judged that the pulley is in the stopped or quasi-stopped state, the whole process flow advances to Step S5. In Step S5, the gear ratio Rm of the continuously variable transmission system 23 is determined based on an output signal from the gear ratio sensor 38. In Step S6, a comparison is made between the gear ratio Rm and a reference gear ratio Rref to judge whether or not the gear ratio Rm is in a low gear-ratio state (i.e. in the low-ratio range) where sufficient acceleration performance is obtainable at the time of restart. If it is judged that the gear ratio Rm is not in the low gear-ratio state where sufficient acceleration performance is obtainable at the time of restart, the whole process flow advances to Step S7.

In Step S7, the actuator 77 is driven to move the driving-pulley movable half part 58c toward the low-ratio range. In Step S8, the gear ratio Rm of the continuously variable transmission system 23 is determined in the same manner as described above in Step S5. In Step S9, a comparison is made between the gear ratio Rm and the reference gear ratio Rref to judge whether or not the gear ratio Rm has lowered to the low gear-ratio state where sufficient acceleration performance is obtainable at the time or restart. If it is judged that the gear ratio Rm has shifted to a sufficient degree toward the low-ratio range, the whole process flow advances to Step S10 where the driving of the actuator is stopped.

The control performed in the process preceding and including Step S10 allows the gear ratio to be returned steadily and reliably to the low-ratio range even after the rotation of the driving pulley has stopped during sudden deceleration. In the state described above, however, a load under which the driving pulley 58 tucks in the V-belt 63 has lowered so that there is the possibility of sliding occurring between the pulley and the V-belt at the initial stage of restart.

Subsequently, in Step S11, the throttle opening Tp is determined based on an output signal from the throttle opening sensor 12. In Step S12, a comparison is made between the throttle opening Tp and a reference throttle opening Tref to judge whether or not the rider is willing to restart. If the throttle opening is over the reference throttle opening Tref and it is judged that the rider is willing to restart, the whole process flow advances to Step S13. In Step S13, the driving-pulley movable half part 58c is pressed onto the V-belt 63 by the actuator 77 to generate a lateral pressure.

By the process described above, a transmission controller for a continuously variable transmission system is implemented which allows steady returning of the gear ratio toward the low-ratio range even after the rotation of the driving pulley has stopped during sudden deceleration and further allows restart without causing sliding between the driving pulley and the belt. The transmission controller for a continuously variable transmission system described herein has a simple structure, reduced weight, and a reduced number of assembly steps.

The invention claimed is:

1. A transmission controller for a continuously variable transmission system of a vehicle having an engine that includes a crankshaft and having a driving wheel, the transmission system includes a driving pulley having an adjustable width, a driven pulley, a belt wound between the driving pulley and the driven pulley, a free wheeling clutch connected between said continuously variable transmission system and said driving wheel and the free wheeling clutch is configured to transmit power only in one direction from said continuously variable transmission system toward said driving wheel, and a start-up clutch connected between said crankshaft of said engine and said driving pulley to transmit power from said crankshaft to said continuously variable transmission system when the number of revolutions of said crankshaft equals or exceeds a specified value, and where a winding diameter of said belt wound between said driving pulley and said driven pulley is changed in accordance with the number of revolutions of said driving pulley, said transmission controller comprising:

gear ratio changing means for changing a gear ratio at the driving pulley of said continuously variable transmission system, said gear ratio changing means is an actuator coupled to said driving pulley, said continuously variable transmission system comprises a worm gear, a worm wheel, and a transmission ring, the gear ratio changing means is configured to change a gear ratio at the driving pulley of said continuously variable transmission system by transmitting a driving force from the actuator to the transmission ring via the worm gear and the worm wheel;

gear ratio detecting means for detecting the gear ratio at the driving pulley of said continuously variable transmission system, the gear ratio detecting means having a position sensor, where the driving force transmitted to the worm wheel is transmitted to the position sensor, the gear ratio detecting means to detect the amount of rotation of the transmission ring;

pulley number-of-revolution detecting means for detecting the number of revolutions of the driving pulley; and control means for performing a control operation to drive said gear ratio changing means, the control means is configured to change a width of said driving pulley when:

(1) said pulley number-of-revolution detecting means detects that the driving pulley has stopped and (2) said gear ratio detecting means detects that the gear ratio of said continuously variable transmission system is not in a specified state.

2. A transmission controller for a continuously variable transmission system according to claim 1, wherein said driven pulley is biased into engagement with said belt; and said gear ratio changing means increases the width of said driving pulley when said pulley number-of-revolution detecting means detects that the driving pulley has stopped and said gear ratio detecting means detects that the gear ratio of said continuously variable transmission system is not in the specified state.

3. A transmission controller for a continuously variable transmission system according to claim 2, wherein said gear ratio changing means increases the width of said driving pulley until the gear ratio of said continuously variable transmission system reaches a specified value when said pulley number-of-revolution detecting means detects that the driving pulley has stopped and said gear ratio detecting means detects that the gear ratio of said continuously variable transmission system is not in the specified state, and said gear ratio changing means then reduces the width of said driving pulley to press said belt.

4. A transmission controller for a continuously variable transmission system according to claim 1, said transmission controller further comprising:
a drive motor, separate from the engine, coupled to said driving wheel and providing power to said driving wheel.

5. A transmission controller for a continuously variable transmission system of a vehicle having an engine that includes a crankshaft and having a driving wheel, the transmission system includes a driving pulley having an adjustable width, a driven pulley, a belt wound between the driving pulley and the driven pulley, a free wheeling clutch connected between said continuously variable transmission system and said driving wheel and the free wheeling clutch is configured to transmit power only in one direction from said continuously variable transmission system toward said driving wheel, and a start-up clutch connected between said crankshaft of said engine and said driving pulley to transmit power from said crankshaft to said continuously variable transmission system when the number of revolutions of said crankshaft equals or exceeds a specified value, and where a winding diameter of said belt wound between said driving pulley and said driven pulley is changed in accordance with the number of revolutions of said driving pulley, said transmission controller comprising:
a gear ratio changer for changing a gear ratio at the driving pulley of said continuously variable transmission system, said gear ratio changer is an actuator coupled to said driving pulley,
said continuously variable transmission system comprises a worm gear, a worm wheel, and a transmission ring, the gear ratio changer is configured to change a gear ratio at the driving pulley of said continuously variable transmission system by transmitting a driving force from the actuator to the transmission ring via the worm gear and the worm wheel;
a gear ratio detector for detecting the gear ratio at the driving pulley of said continuously variable transmission system, the gear ratio detector having a position sensor, where the driving force transmitted to the worm wheel is transmitted to the position sensor, the gear ratio detector to detect the amount of rotation of the transmission ring;
a pulley number-of-revolution detector for detecting the number of revolutions of the driving pulley; and
a control for performing a control operation to drive said gear ratio changer, the control is configured to change a width of said driving pulley when:
(1) said pulley number-of-revolution detector detects that the driving pulley has stopped and
(2) said gear ratio detector detects that the gear ratio of said continuously variable transmission system is not in a specified state.

6. A transmission controller for a continuously variable transmission system according to claim 5, wherein
said driven pulley is biased into engagement with said belt; and
said gear ratio changer increases the width of said driving pulley when said pulley number-of-revolution detector detects that the driving pulley has stopped and said gear ratio detector detects that the gear ratio of said continuously variable transmission system is not in the specified state.

7. A transmission controller for a continuously variable transmission system according to claim 6, wherein said gear ratio changer increases the width of said driving pulley until the gear ratio of said continuously variable transmission system reaches a specified value when said pulley number-of-revolution detector detects that the driving pulley has stopped and said gear ratio detector detects that the gear ratio of said continuously variable transmission system is not in the specified state, and said gear ratio changer then reduces the width of said driving pulley to press said belt.

8. A transmission controller for a continuously variable transmission system according to claim 5, said transmission controller further comprising:
a drive motor, separate from the engine, coupled to said driving wheel and providing power to said driving wheel.

* * * * *